United States Patent
Mills et al.

(10) Patent No.: US 12,276,543 B2
(45) Date of Patent: Apr. 15, 2025

(54) READOUT CIRCUITS FOR AMPLITUDE MODULATING SENSORS

(71) Applicant: Interdisciplinary Consulting Corporation, Gainesville, FL (US)

(72) Inventors: David Alan Mills, Gainesville, FL (US); William C. Patterson, Gainesville, FL (US)

(73) Assignee: INTERDISCIPLINARY CONSULTING CORPORATION, Gainesville, FL (US)

(*) Notice: Subject to any disclaimer, the term of this patent is extended or adjusted under 35 U.S.C. 154(b) by 309 days.

(21) Appl. No.: 17/900,419

(22) Filed: Aug. 31, 2022

(65) Prior Publication Data

US 2024/0019296 A1    Jan. 18, 2024

Related U.S. Application Data (60) Provisional application No. 63/388,445, filed on Jul. 12, 2022.

(51) Int. Cl.
*G01J 1/04* (2006.01)
*G01J 1/42* (2006.01)
*G01J 1/44* (2006.01)

(52) U.S. Cl.
CPC ........... *G01J 1/0437* (2013.01); *G01J 1/4228* (2013.01); *G01J 1/44* (2013.01); *G01J 2001/4242* (2013.01)

(58) Field of Classification Search
CPC .......... G01J 1/0437; G01J 1/4228; G01J 1/44; G01J 2001/4242; G01L 1/242; G01P 15/093; G01P 3/36
See application file for complete search history.

(56) References Cited

U.S. PATENT DOCUMENTS 2,772,479 A * 12/1956 Doyle ................ G01P 3/54
                                                   356/28
3,076,376 A *  2/1963 Kalmus ............... G01J 1/44
                                                   250/214 R
(Continued)

FOREIGN PATENT DOCUMENTS

CN        108168686 A      6/2018
EP          0347120 A2    12/1989
(Continued)

OTHER PUBLICATIONS

Jianglei Di et al. "Dual-wavelength common-path digital holographic microscopy for quantitative phase imaging based on lateral shearing interferometry" Applied Optics, Sep. 7, 2016, 7 pages, vol. 55, No. 26.

(Continued)

*Primary Examiner* — Tarifur R Chowdhury
*Assistant Examiner* — Kemaya Nguyen
(74) *Attorney, Agent, or Firm* — Talem IP Law, LLP (57) ABSTRACT

A readout circuit for an amplitude modulating sensor includes a first and second wavelength light source; an optical coupler coupled to receive a first light signal from the first wavelength light source and a second light signal from the second wavelength light source; a frequency selector that allows for the first light signal to pass to the amplitude modulating sensor; and a detector system coupled to the optical coupler to receive the first light signal and the second light signal after the first light signal is modulated by the amplitude modulating sensor and independently detect the two signals. The detector system generates electronic signals representing the modulated first light signal and the second light signal and removes a common mode signal of the modulated first light signal and the second light signal, (Continued)

removing common mode noise or attenuation in the modulated first light signal.

15 Claims, 5 Drawing Sheets

(56) References Cited

U.S. PATENT DOCUMENTS

| | | | |
|---|---|---|---|
| 4,085,423 A | | 4/1978 | Tsunoda et al. |
| 4,102,572 A | | 7/1978 | O'Meara |
| 4,356,396 A | * | 10/1982 | Ruell ................ G01D 5/268 |
| | | | 250/231.19 |
| 4,924,870 A | * | 5/1990 | Wlodarczyk ......... G01L 9/0077 |
| | | | 73/705 |
| 6,188,132 B1 | | 2/2001 | Shih et al. |
| 2013/0107263 A1 | * | 5/2013 | Braun ................ G01N 21/3504 |
| | | | 356/432 |
| 2021/0063452 A1 | * | 3/2021 | Li ........................... G01R 23/17 |
| 2021/0405163 A1 | | 12/2021 | Yeun |

FOREIGN PATENT DOCUMENTS

| | | |
|---|---|---|
| EP | 0494767 A2 | 7/1992 |
| JP | H11-97804 A | 4/1999 |
| JP | 2009-068841 A | 4/2009 |
| WO | 2016/196463 A1 | 12/2016 |
| WO | 2021/095904 A1 | 5/2021 |

OTHER PUBLICATIONS

O. B. Wright "Stabilized dual-wavelength fiber-optic interferometer for vibration measurement" Optics Letters, Jan. 1, 1991, 3 pages, vol. 16, No. 1.

* cited by examiner

READOUT CIRCUITS FOR AMPLITUDE MODULATING SENSORS

CROSS-REFERENCE TO RELATED APPLICATION

This application claims the benefit of U.S. Provisional Application No. 63/388,445, filed on Jul. 12, 2022.

STATEMENT REGARDING GOVERNMENT FUNDING

This invention was made with Government support under Contract No. 80NSSC20C0378 awarded by NASA. The Government has certain rights in the invention.

BACKGROUND

Amplitude modulating sensors, such as optical sensors, have emerged as a promising new technology for a variety of applications, including operation as velocimeters, accelerometers, force transducers, pressure transducers and even vibration, axial motion, proximity, rotation, part gauging, film thickness, eccentricity, and liquid level sensing. For pressure sensing, certain optical sensors have advantages over traditional microphone and dynamic pressure sensors including a simple, robust fabrication process, immunity to electromagnetic interference (EMI), and thinner, smaller-footprint packages that allow both a higher density of sensors as well as a lower profile for each individual sensor. Pressure-sensing optical sensors can also offer higher bandwidth and reduced sensitivity to environmental factors (e.g., temperature, humidity). However, optical sensors also require either localized circuitry for interpretation of signals or fiber optic transmission media.

Fiber optics have long been used in data transmission. Fiber optic cables have a variety of properties that make them advantageous for fast and efficient data transmission. Fiber optics offers significantly more bandwidth than alternatives, and data transmitted is significantly more secure. Data transmitted is also generally less vulnerable to signal interference, as there is no electromagnetic interference owing to the lack of electrical signals and resultant crosstalk. Fiber optics can also be more resilient to extreme temperatures or humidity. However, fiber optics are not immune entirely from interference. For example, fiber optics are susceptible to refractance and reflection that alters a waveform during travel into, out of, and through the fiber optic network.

BRIEF SUMMARY

Readout circuits for amplitude modulating sensors are provided. The described readout circuits enable fiber optic transmission of data from amplitude modulating sensors, which can offer efficient and fast transmission between the sensor and a monitoring computing device.

Two wavelengths of light (i.e., light at two different frequencies) are used to capture a signal from an amplitude modulating sensor. One of the two wavelengths is directed to the sensor to be modulated by the sensor, capturing the signal before being recombined with the other of the two wavelengths, which functions as a reference signal. Accordingly, the first wavelength carries the combination of information from the sensor and the noise/attenuation introduced to or caused by the transmission path and the second wavelength is used as a reference signal that detects common mode noise or attenuation introduced to or caused by the transmission path.

A readout circuit for an amplitude modulating sensor can include a first wavelength light source; a second wavelength light source; an optical coupler coupled to receive both a first light signal from the first wavelength light source and a second light signal from the second wavelength light source; a frequency selector that allows for only the first light signal to pass to the amplitude modulating sensor; and a detector system coupled to the optical coupler to receive the first light signal and the second light signal after the first light signal is modulated by the amplitude modulating sensor and independently detect the modulated first light signal and the second light signal. The detector system generates electronic signals representing the modulated first light signal and the second light signal and removes a common mode signal of the modulated first light signal and the second light signal, removing common mode noise or attenuation in the modulated first light signal. The readout circuit can be configured for wavelength division multiplexing, electronic frequency-domain multiplexing, or electronic time-domain multiplexing, as well as other configurations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 3A-3C illustrate three example circuit architectures of readout circuits for amplitude modulating sensors.

DETAILED DESCRIPTION

Readout circuits for amplitude modulating sensors are provided. The described readout circuits enable fiber optic transmission of data from amplitude modulating sensors, which can offer efficient and fast transmission between the sensor and a monitoring computing device.

The described readout circuits are suitable for use with a fiber-optic pressure sensor for model-scale ground test and full-scale static engine and in-flight test applications (e.g., for diagnostic measurements of jet engine noise). Optical pressure sensors can be advantageous in measuring pressure in aircraft propulsion due to a relatively low profile (so as not to disturb the airflow), resistance to high temperatures (temperatures in engines can exceed 600 degrees Celsius), and high bandwidth. Fiber optic transmission can allow high bandwidth transmission of the modulated waveforms away from the engines and to a place more suitable for analysis.

Figure 1:
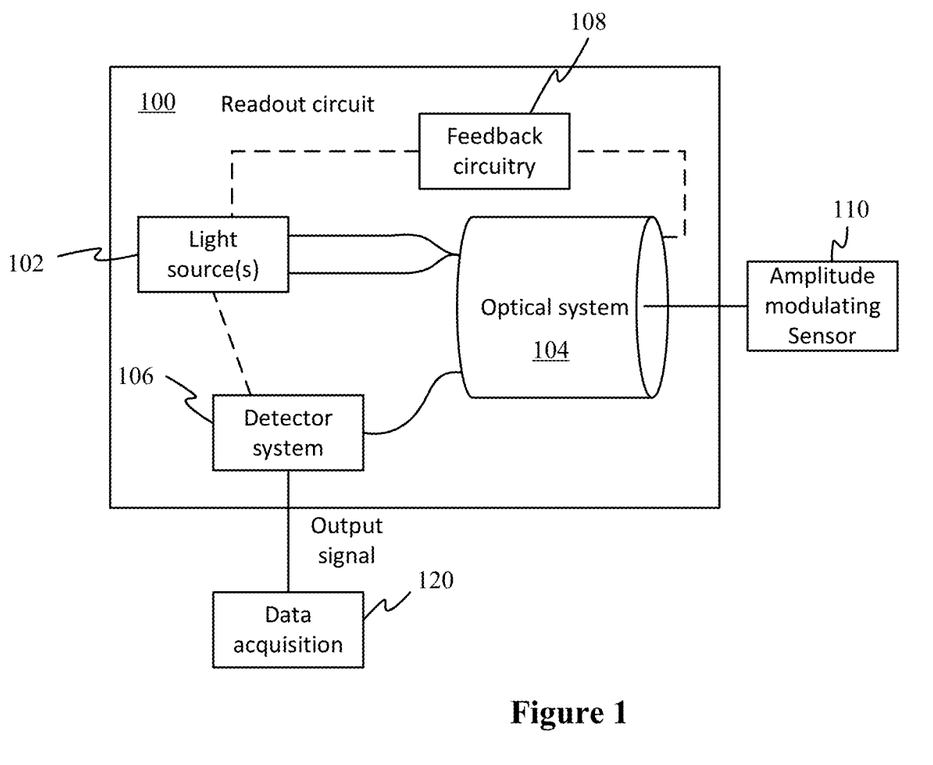
FIG. 1 illustrates a system for measuring the output of an amplitude modulating sensor using a readout circuit.

FIG. 1 illustrates a system for measuring the output of an amplitude modulating sensor using a readout circuit. Readout circuit 100 includes a light source 102, optical system 104, and detector system 106. The light source 102 can be a single light source that can output two different wavelengths or two different light sources. Optical system 104 includes fiber optics and a selective device. The selective device is an optical device that allows for selective transmission of a particular wavelength. Examples of selective devices include, but are not limited to, a mirror (e.g., dichroic mirror) and a beam splitter. The detector system 106 includes one or more photodetectors, optoelectronics and control circuitry. The one or more photodetectors are configured to capture the wavelengths of the light from the light source 102, independently detecting the different wavelengths/frequencies of the light and outputting representative electronic signals of the different wavelengths/frequencies of the light. The optoelectronics include appropriate output circuitry (e.g., for generating a signal of interest from the output of the one or more photodetectors) and optional signal conditioning circuitry. The control circuitry can be coupled to the light source 102 to control operation of the light source 102. In some cases, feedback circuitry 108 can be included for additional control and stabilization (e.g., to a constant amplitude) of the light output from light source 102. Feedback circuitry 108 can include a reference detector, which can include one or more reference photodiodes, and a filter. Example feedback circuitry 108 is shown in the detector systems illustrated in FIGS. 3A-3C.

Readout circuit 100 provides a signal to an amplitude modulating sensor 110 and captures the modulated signal for data storage or analysis (via data acquisition 120) in a manner that removes noise and attenuation introduced to or caused by the transmission path. An example operation of readout circuit 100 is described with respect to FIG. 2.

Figure 2:
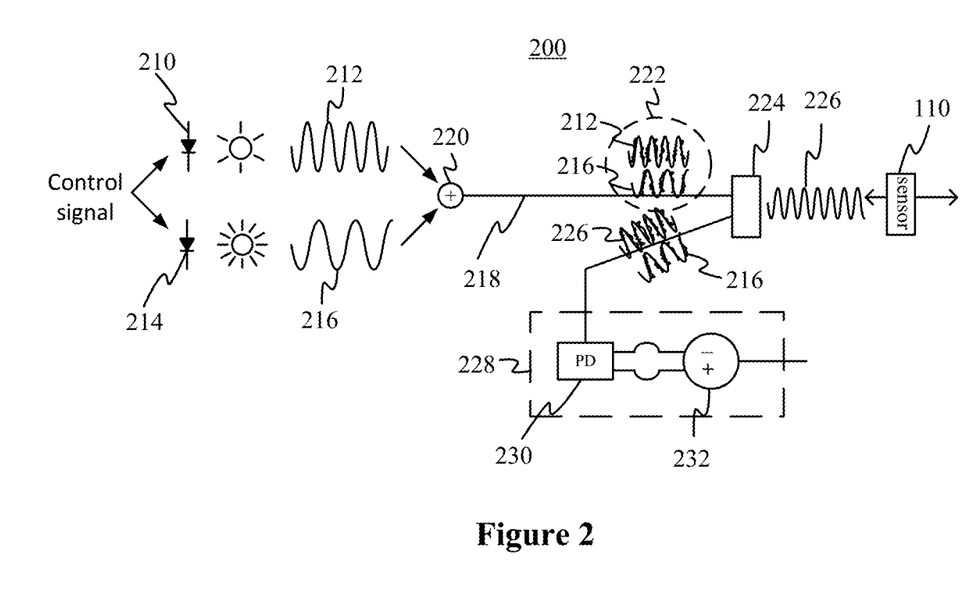
FIG. 2 illustrates operation of a readout circuit for an amplitude modulating sensor.

FIG. 2 illustrates operation of a readout circuit for a modulating sensor. Referring to FIG. 2, in system 200, two wavelengths of light are used over a common optical path (e.g., fiber optic) to stabilize/remove noise of an amplitude modulating sensor.

The two wavelengths of light can be output from two light sources: a first wavelength light source 210 that produces a carrier signal 212 and a second wavelength light source 214 that produces a reference signal 216. In some cases, a single light source with multiple wavelength capabilities may be used as the two light sources. The wavelength of light emitted from the first wavelength light source 210 is different from the wavelength of light emitted from the second wavelength light source 214; for example, the carrier signal 212 can have a wavelength of 850 nanometers and the reference signal 216 can have a wavelength of 1300 nanometers. The two light sources (e.g., the first wavelength light source 210 and the second wavelength light source 214) can be, for example, light emitting diodes that are each designed to emit only a single wavelength of light. The light sources can be driven by alternating current or direct current sources or can be driven in part by a switch circuit based on a clock signal. The carrier signal 212 and reference signal 216 can be coupled to an optical fiber (and optical coupler 218) by a fiber connector 220 or other coupling structure (e.g., lens, tapered fiber). While traveling down a common optical path in the optical coupler 218, the carrier signal 212 and the reference signal 216 are both affected by any undesirable noise and/or attenuation (resulting in noisy and/or attenuated signals 222).

A frequency selector 224 is used to direct the carrier signal 212 to the sensor 110. The frequency selector 224 can allow some frequencies of light (e.g., the carrier signal 212) to pass while preventing others (e.g., the reference signal 216). The frequency selector 224 can be embodied, for example, as a beam splitter or mirror. The carrier signal 212 is modulated by the sensor 110, becoming a modulated carrier signal 226, which returns on the path with the reference signal 216.

The modulated carrier signal 226 and the reference signal 216 are detected by the detector system 228, which includes one or more photodetectors 230. The one or more photodetectors 230 independently detect the modulated carrier signal 226 and the reference signal 216 and output separate representative electronic signals (e.g., voltage or current values representing the received signals). The representative electronic signal of the reference signal 216 is subtracted from the representative electronic signal of the modulated carrier signal 226 to remove the common mode signal, resulting in a stable and noise free demodulated transducer signal (e.g., a voltage output signal that consists of the transducer signal information of interest). For example, a comparator 232 can be used to remove the common mode signal. Specific architectures of example detector systems can be seen in FIGS. 3A-3C.

Figure 3A:
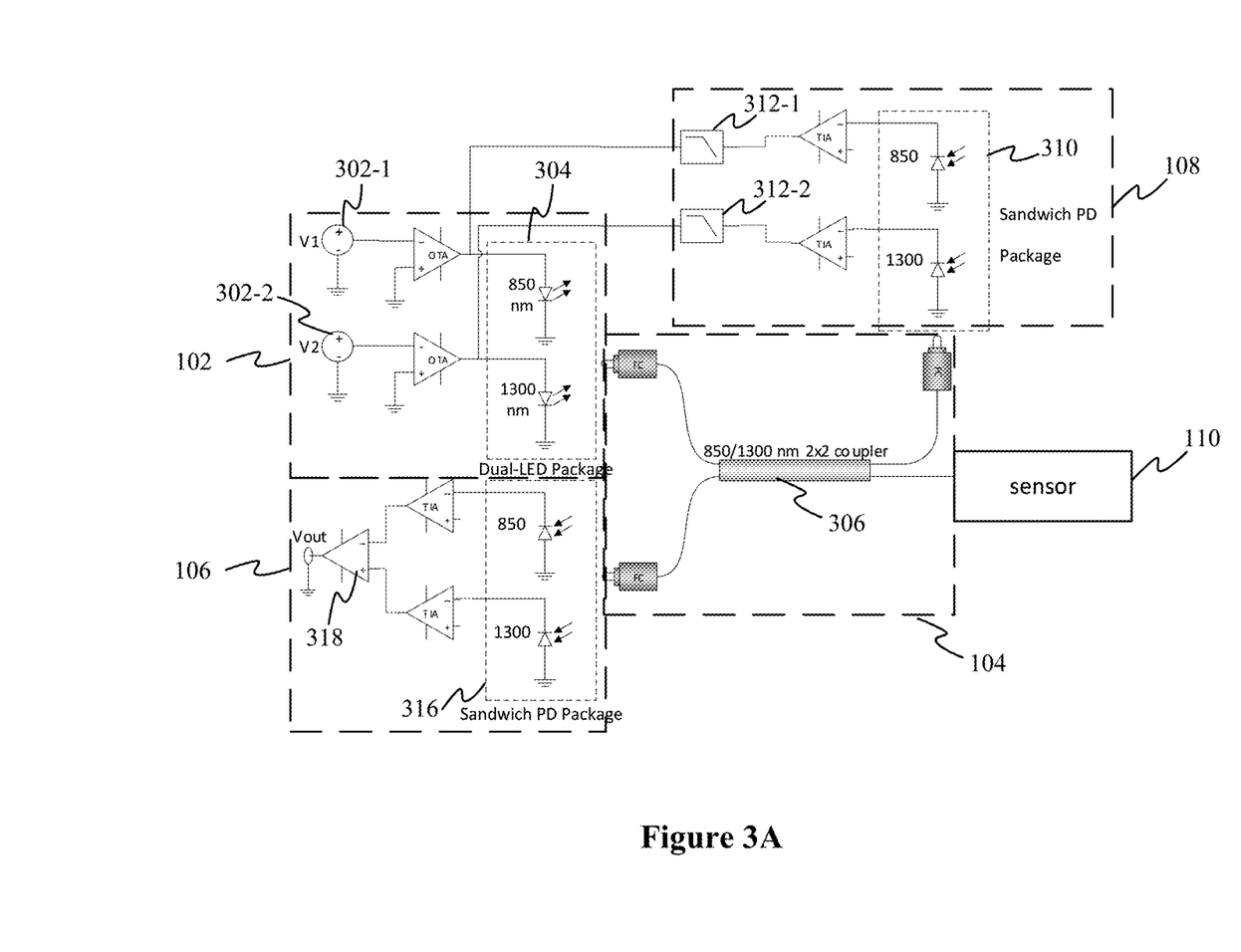
FIG. 3A shows a wavelength division multiplexing configuration.
Figure 3B:
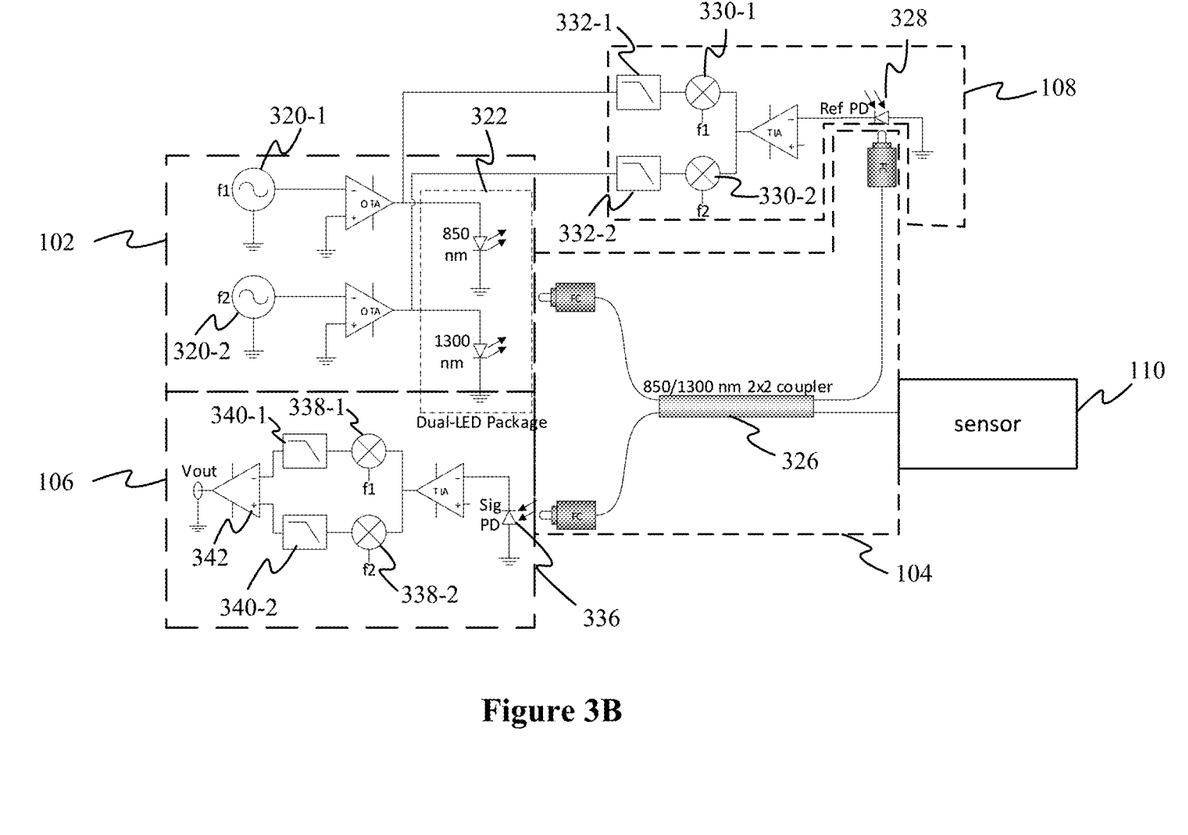
FIG. 3B shows an electronic frequency-domain multiplexing configuration.
Figure 3C:
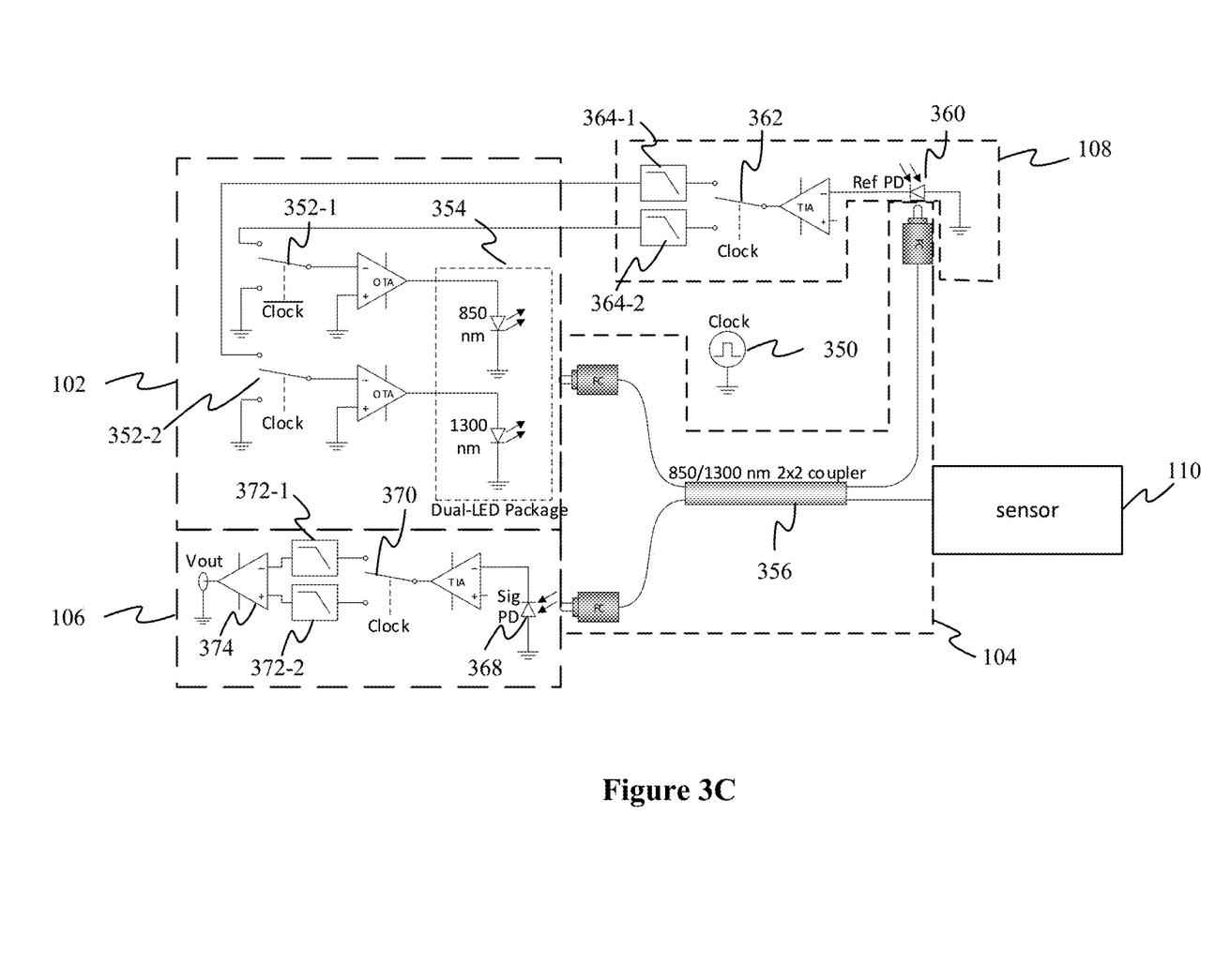
FIG. 3C shows an electronic time-domain multiplexing configuration.

FIGS. 3A-3C illustrate three example circuit architectures of readout circuits for amplitude modulating sensors. FIG. 3A shows a wavelength division multiplexing configuration, FIG. 3B shows an electronic frequency-domain multiplexing configuration, and FIG. 3C shows an electronic time-domain multiplexing configuration.

Referring to FIG. 3A, the light source(s) 102, optical system 104, detector system 106, and feedback circuitry 108 of FIG. 1 can be implemented using a wavelength division multiplexing (WDM) architecture. In the example WDM architecture, the light source(s) are implemented using fixed voltage sources 302-1, 302-2 (e.g., direct current) to drive two light sources of a dual LED package 304. The optical system 104 can include a 2×2 coupler 306 that receives the two light signals, sending both light signals (which have been combined in the coupler 306) to the feedback circuitry 108, one of the light signals to the sensor 110, and a combined signal of the modulated light signal returning from the sensor 110 and the other light signal to the detector system 106.

The feedback circuitry 108 includes a WDM splitter in the form of a sandwich photodiode detector 310 (or layered photodiodes) with corresponding amplifiers and low pass filters 312-1, 312-2.

The detector system 106 also includes a WDM splitter, which may be implemented using two different photodiodes or the same photodiode that is able to detect the two different frequencies. In the illustrative example, the WDM splitter is in the form of a sandwich photodiode detector 316. The captured signals are amplified and then subtracted at comparator 318 to output the signal from the amplitude modulation.

Referring to FIG. 3B, the light source(s) 102, optical system 104, detector system 106, and feedback circuitry 108 of FIG. 1 can be implemented using an electronic frequency-domain multiplexing (FDM) architecture. In the example FDM architecture, the light source(s) are implemented using variable voltage sources 320-1, 320-2 (e.g., alternating current) to drive two light sources of a dual LED package 322. The variable voltage sources 320-1, 320-2 can be driven at different frequencies (e.g., 1 megahertz and 1.2 megahertz). Similar to that described with respect to FIG. 3A, the optical system 104 can include a 2×2 coupler 326 that receives the two light signals, sending both light signals (which have been combined in the coupler 326) to the feedback circuitry 108, one of the light signals to the sensor 110, and a combined signal of the modulated light signal returning from the sensor 110 and the other light signal to the detector system 106.

The feedback circuitry 108 includes a single photodiode 328 that receives the combined signal from the 2×2 coupler 326. The combined signal can be split using electronic circuits, including a stabilizer such as a peak detector or lock-in amplifier and a filtering component (e.g., multiplexers 330-1, 330-2 and filters 332-1, 332-2) and fed back to stabilize the amplitude of the light signals at the LED package 322.

The detector system 106 also includes a single photodiode 336 whose output is split using electronic circuits such as described with respect to the feedback circuitry. In particular, in the illustrated example, multiplexers 338-1, 338-2 and filters 340-1, 340-2 are used to split the combined signal at the detector (e.g., to separate the carrier and signal base bands). The split signals are subtracted at comparator 342 to output the signal from the amplitude modulation.

Referring to FIG. 3C, the light source(s) 102, optical system 104, detector system 106, and feedback circuitry 108 of FIG. 1 can be implemented using an electronic time-domain multiplexing (TDM) architecture. The readout circuit can include a clock timing circuit 350. The clock timing circuit 350 (providing clock and clock bar) can be used to control various switches in the readout circuit.

In the example TDM architecture, the light source(s) are implemented using switches 352-1, 352-2 controlled by the clock timing circuit 350 to drive two light sources of a dual LED package 354 at opposite times (e.g., by using clock and clock bar respectively). Similar to that described with respect to FIG. 3A, the optical system 104 can include a 2×2 coupler 356 that receives the two light signals, sending both light signals (which have been combined in the coupler 356) to the feedback circuitry 108, one of the light signals to the sensor 110, and a combined signal of the modulated light signal returning from the sensor 110 and the other light signal to the detector system 106.

The feedback circuitry 108 includes a single photodiode 360 that receives the light signals from the 2×2 coupler 356. Because the two light signals are transmitted through the coupler at opposite phases (due to the clocking), the signal received at the photodiode 360 can be split between two paths using switch 362 controlled by the clock timing circuit 350. The two paths, which are fed back to stabilize the amplitude of the light signals at the LED package 354, can each include a corresponding filter 364-1, 364-2.

The detector system 106 also includes a single photodiode 368 whose output is 'split' such as described with respect to the feedback circuitry. In particular, in the illustrated example, the signal received at the photodiode 368 can be split between two paths using switch 370 controlled by the clock timing circuit 350. The two paths can each include a corresponding filter 372-1, 372-2. The split signals are subtracted at comparator 374 to output the signal from the amplitude modulation.

Since only one light source is ever functional at a given time, the received light signal (at the feedback circuitry 108 and the detector system 106) is composed of alternating sections of light with frequencies of the two light sources. As such, a switch can be used to 'split' the signal based on the time.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A readout circuit for an amplitude modulating sensor comprising:
   a first wavelength light source;
   a second wavelength light source;
   an optical coupler coupled to receive both a first light signal from the first wavelength light source and a second light signal from the second wavelength light source;
   a frequency selector that allows for the first light signal to pass from the optical coupler to the amplitude modulating sensor; and
   a detector system coupled to the optical coupler to receive the first light signal and the second light signal after the first light signal is modulated by the amplitude modulating sensor and independently detect the modulated first light signal and the second light signal, wherein the detector system generates electronic signals representing the modulated first light signal and the second light signal and removes a common mode signal of the modulated first light signal and the second light signal, removing common mode noise or attenuation in the modulated first light signal.

2. The readout circuit of claim 1, wherein the first wavelength light source and the second wavelength light source are driven by a direct current source.

3. The readout circuit of claim 2, wherein the detector system comprises:
   two photodetectors, each of the two photodetectors corresponding to a respective wavelength of the first light signal and the second light signal; and
   a comparator coupled to an output of the two photodetectors for removing the common mode signal.

4. The readout circuit of claim 1, wherein the first wavelength light source and the second wavelength light source are driven by an alternating current source.

5. The readout circuit of claim 4, wherein the detector system comprises:
   one photodetector;
   an electronic splitting circuit splitting the electronic signals representing the modulated first light signal and the second light signal; and
   a comparator coupled to an output of the electronic splitting circuit for removing the common mode signal.

6. The readout circuit of claim 1, further comprising a clock timing circuit.

7. The readout circuit of claim 6, wherein the first wavelength light source and the second wavelength light source are driven by opposite clock signals from the clock timing circuit.

8. The readout circuit of claim 7, wherein the detector system comprises:
   a single photodiode;
   a first filter;
   a second filter;
   a switch controlled by the clock timing circuit to direct an output of the single photodiode between the first filter and the second filter; and
   a comparator coupled to the first filter and the second filter for removing the common mode signal.

9. The readout circuit of claim 1, wherein the frequency selector is a mirror.

10. The readout circuit of claim 1, wherein the frequency selector is a beam splitter.

11. The readout circuit of claim 1, further comprising a feedback circuit coupled to receive the first light signal and the second light signal from the optical coupler and feed back a signal to stabilize an amplitude of the first light signal and the second light signal.

12. The readout circuit of claim 11, wherein the first wavelength light source and the second wavelength light source are driven by a direct current source, wherein the feedback circuit comprises:
   a wavelength division multiplexing splitter for splitting the first light signal and the second light signal based on a respective wavelength of the first light signal and the second light signal;
   a first amplifier coupled to receive the first light signal from the wavelength division multiplexing splitter;
   a second amplifier coupled to receive the second light signal from the wavelength division multiplexing splitter;
   a first low pass filter coupled to an output of the first amplifier; and
   a second low pass filter coupled to an output of the second amplifier, wherein the first low pass filter and the second low pass filter output respective signals for stabilizing the amplitude of the first light signal and the second light signal that are output by the first wavelength light source and the second wavelength light source.

13. The readout circuit of claim 11, wherein the first wavelength light source and the second wavelength light source are driven by an alternating current source, wherein the feedback circuit comprises:
   a single photodiode that receives the first light signal and the second light signal from the optical coupler;
   a stabilizer coupled to receive a combined signal of the first light signal and the second light signal output from the single photodiode; and
   a filtering component coupled to an output of the stabilizer,
   wherein the filtering component splits the combined signal from the stabilizer and outputs respective signals for stabilizing the amplitude of the first light signal and the second light signal that are output by the first wavelength light source and the second wavelength light source.

14. The readout circuit of claim 13, wherein the stabilizer comprises a peak detector or lock-in amplifier,
   wherein the filtering component comprises:
      a first multiplexer coupled to the output of the stabilizer;
      a second multiplexer coupled to the output of the stabilizer;
      a first filter coupled to an output of the first multiplexer; and
      a second filter coupled to an output of the second multiplexer,
      wherein the first filter and the second filter output respective signals for stabilizing the amplitude of the first light signal and the second light signal that are output by the first wavelength light source and the second wavelength light source.

15. The readout circuit of claim 11, further comprising a clock timing circuit, wherein the first wavelength light source and the second wavelength light source are driven by opposite clock signals from the clock timing circuit, wherein the feedback circuit comprises:
   a single photodiode;
   a switch coupled to receive an output of the single photodiode;
   a first filter; and
   a second filter,
   wherein the switch is controlled by the clock timing circuit to split the first light signal and the second light signal detected by the single photodiode between the first filter and the second filter,
   wherein the first filter and the second filter output respective signals for stabilizing the amplitude of the first light signal and the second light signal that are output by the first wavelength light source and the second wavelength light source.

* * * * *